United States Patent
Williams et al.

(10) Patent No.: US 12,139,598 B2
(45) Date of Patent: *Nov. 12, 2024

(54) PROCESS AND APPARATUS FOR MANUFACTURE OF PROCESSABLE POLYVINYL ALCOHOL

(71) Applicant: Aquapak Polymers Limited, Birmingham (GB)

(72) Inventors: John Williams, Chirbury (GB); Sian Griffiths, Glan Conwy (GB); Robert Ashworth, Colwyn Bay (GB)

(73) Assignee: Aquapak IP Limited, Birmingham (GB)

( * ) Notice: Subject to any disclaimer, the term of this patent is extended or adjusted under 35 U.S.C. 154(b) by 51 days.

This patent is subject to a terminal disclaimer.

(21) Appl. No.: 17/368,164

(22) Filed: Jul. 6, 2021

(65) Prior Publication Data

US 2022/0002518 A1 Jan. 6, 2022

(30) Foreign Application Priority Data

Jul. 6, 2020 (EP) .................................. 20184345

(51) Int. Cl.
| | | |
|---|---|---|
| *C08L 29/04* | (2006.01) | |
| *B29B 7/48* | (2006.01) | |
| *C08F 2/01* | (2006.01) | |
| *C08F 2/44* | (2006.01) | |
| *C08F 116/06* | (2006.01) | |
| *C08J 3/05* | (2006.01) | |
| *C08J 3/18* | (2006.01) | |
| *C08K 5/053* | (2006.01) | |
| *C08K 5/092* | (2006.01) | |
| *C08K 5/098* | (2006.01) | |
| *C08K 5/12* | (2006.01) | |
| *C08K 5/3412* | (2006.01) | |
| *B29K 229/00* | (2006.01) | |

(52) U.S. Cl.
CPC .............. *C08L 29/04* (2013.01); *B29B 7/487* (2013.01); *C08F 2/01* (2013.01); *C08F 2/44* (2013.01); *C08F 116/06* (2013.01); *C08J 3/05* (2013.01); *C08J 3/18* (2013.01); *C08K 5/053* (2013.01); *C08K 5/092* (2013.01); *C08K 5/098* (2013.01); *C08K 5/12* (2013.01); *C08K 5/3412* (2013.01); *B29K 2229/04* (2013.01); *C08J 2329/04* (2013.01); *C08K 2201/014* (2013.01); *C08L 2201/50* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 3,607,812 A | 9/1971 | Takigawa et al. | |
| 11,884,807 B2 * | 1/2024 | Williams | ............... C08F 116/06 |
| 2005/0001348 A1 | 1/2005 | Kohnen et al. | |
| 2017/0081442 A1 | 3/2017 | Johnson et al. | |
| 2017/0247154 A1 * | 8/2017 | Ieda | ........................ C08K 5/098 |
| 2022/0002532 A1 * | 1/2022 | Williams | ............... C08F 116/06 |
| 2023/0331876 A1 * | 10/2023 | Williams | ................ B29B 7/426 |
| 2023/0348638 A1 * | 11/2023 | Williams | ............... C08F 116/06 |

FOREIGN PATENT DOCUMENTS

| | | | |
|---|---|---|---|
| CN | 101864132 | * | 10/2010 |
| CN | 102234405 | * | 11/2011 |
| CN | 104073000 | * | 10/2014 |
| CN | 106189013 A | | 12/2016 |
| CN | 109181186 | * | 1/2019 |
| CN | 110903578 A | | 3/2020 |
| CN | 111087730 | * | 5/2020 |
| WO | 9722658 A1 | | 6/1997 |
| WO | 9954400 A1 | | 10/1999 |
| WO | 2017/046361 A1 | | 3/2017 |

OTHER PUBLICATIONS

Zhifeng; Effects of the Molecular Structure of Polyvinylalcohol on the Adhesion to Fibre Substrates; Fibres and Textiles in Eastern Europe vol. 15 No. 1 (2007) pp. 82-85. (Year: 2007).*

* cited by examiner

*Primary Examiner* — David J Buttner
(74) *Attorney, Agent, or Firm* — Young Basile Hanlon & MacFarlane, P.C.

(57) ABSTRACT

The invention describes a method for manufacture of plasticized homopolymeric polyvinyl alcohol, the method including the steps of introducing a polyvinyl alcohol polymer or a blend thereof having a degree of hydrolysis in the range of 93 wt % to 98 wt % into a mixing reactor; adding a processing agent, a plasticizer and a reactive stabilizer to form a reaction mixture; wherein the plasticizer is selected from the group consisting of sugar alcohols, diols, triols, polyols and mixtures thereof; wherein the reactive stabilizer is selected from the group consisting of sodium stearate, potassium oleate, sodium benzoate, calcium stearate, stearic acid, dimethyl propionic acid, and mixtures thereof; —reacting the reaction mixture in a reaction zone to form plasticized polymer; and—allowing the plasticized polymer to pass from the reaction zone.

13 Claims, 4 Drawing Sheets

PROCESS AND APPARATUS FOR MANUFACTURE OF PROCESSABLE POLYVINYL ALCOHOL

CROSS-REFERENCE TO RELATED APPLICATION(S)

This application claims priority to European Application Patent Serial No. 20184345.5, filed Jul. 6, 2020, the entire disclosure of which is hereby incorporated by reference.

TECHNICAL FIELD

This invention relates to a process for manufacture of polyhydric polymers, particularly polyvinyl alcohol. The invention also relates to apparatus for use in carrying out the method. The invention further relates particularly but not exclusively to a method of manufacture of polyvinyl alcohol in a suitable physical form for processing into film or other extruded products. The invention further relates to a novel processable polyvinyl alcohol composition which may be made using the process.

BACKGROUND

Polyvinyl alcohol is commonly made by hydrolysis of polyvinyl acetate. The degree of hydrolysis affects the properties of the polymer. Polyvinyl alcohol having a low degree (LD) of hydrolysis, below 84%, is widely used in industry. Vinyl acetate copolymers, for example, with ethylene acetate have been used to make vinyl alcohol co-polymers which are easier to process. However, these co-polymers lack the advantageous physical properties of homopolymer polyvinyl alcohol, particularly highly hydrolysed polyvinyl alcohol homopolymer. The present invention relates particularly to polyvinyl alcohol made by hydrolysis of homopolymeric polyvinyl acetate.

Highly hydrolysed polyvinyl acetate, that is with a degree of hydrolysis greater than 93, for example, 98% or higher, is a polymer which essentially comprises homo-polyvinyl alcohol. This polymer, similar to many carbohydrates, decomposes before its melting point of about 250° C. is reached. This makes melt processing difficult and for this reason the highly hydrolysed polyvinyl alcohol polymer has been processed as an aqueous solution. Partially hydrolysed polyvinyl acetate is readily melt processed. For example, 80% hydrolysed polyvinyl acetate, can be readily extruded or converted into film by blow molding.

The significant difference between highly hydrolysed (high degree of hydrolysis, HD) and partially hydrolysed (low degree of hydrolysis, LD) polyvinyl alcohols is the extent and quality of the crystalline order due to the differences in the chain structures. Polyvinyl alcohols with less than 2% non-hydrolysed acetate groups can readily crystallise to form strongly hydrogen bonded crystalline domains. These crystalline domains have a structure which is essentially the same as found in polyethylene. The reason for this may be attributed to the small size of the hydroxyl group. However, because of the hydrogen bonding, the melting point of highly hydrolysed polyvinyl alcohol is about 150° C. higher than that of polyethylene. Polyols have been used as plasticisers, but efficient manufacture of plasticised polyvinyl alcohol with a high degree of hydrolysis has been difficult to achieve.

WO 2017/046361 discloses a method for manufacture of a plasticised polyvinyl alcohol having a degree of hydrolysis of 98 wt % or higher.

DETAILED DESCRIPTION

Figure 1:
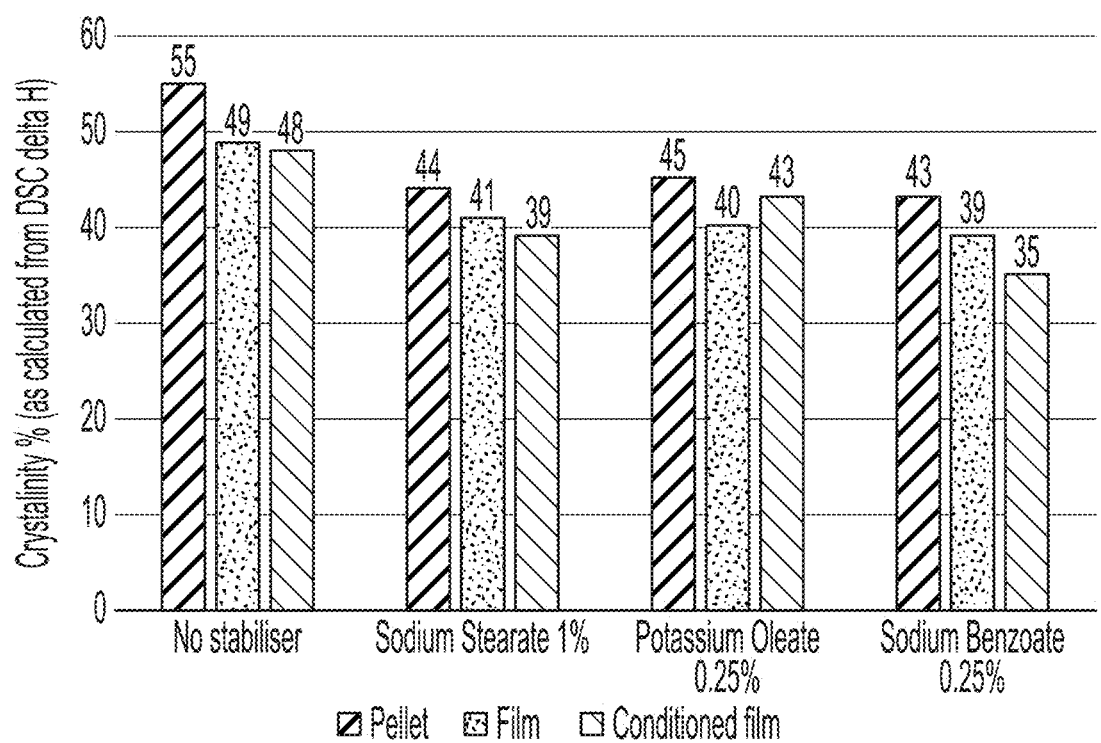
FIG. 1 illustrates the effect on crystallinity by use of reactive stabilisers in pellet, film and conditioned film.
Figure 3:
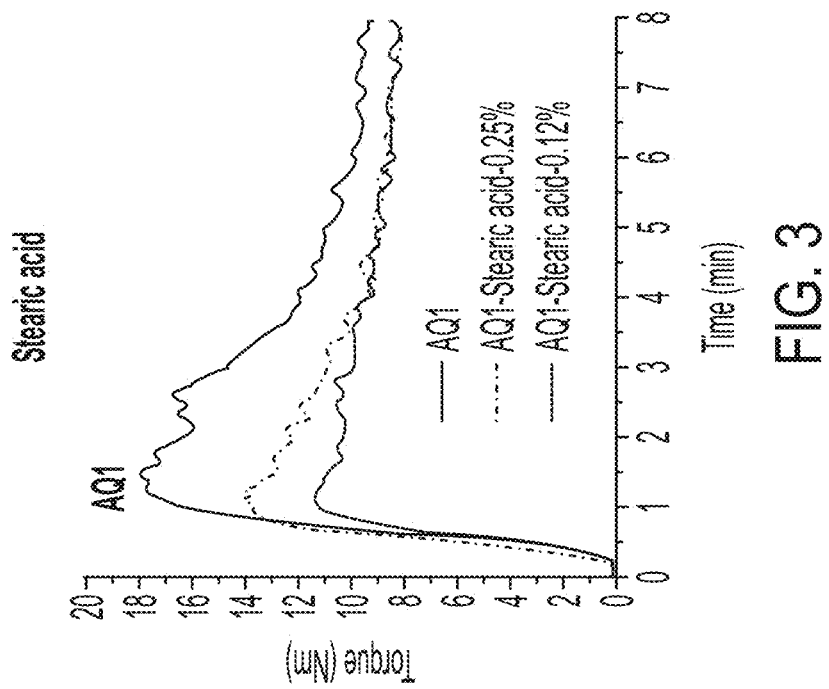
FIG. 3 illustrates torque analysis of the polyvinyl alcohol homopolymers stabilised with stearic acid.
Figure 2:
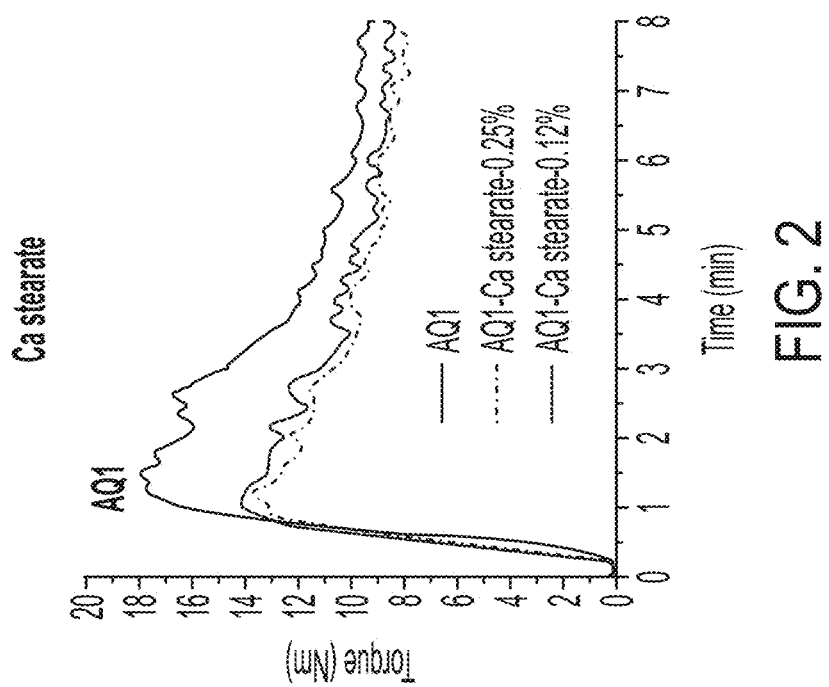
FIG. 2 illustrates torque analysis of the polyvinyl alcohol homopolymers stabilised with calcium stearate.
Figure 5:
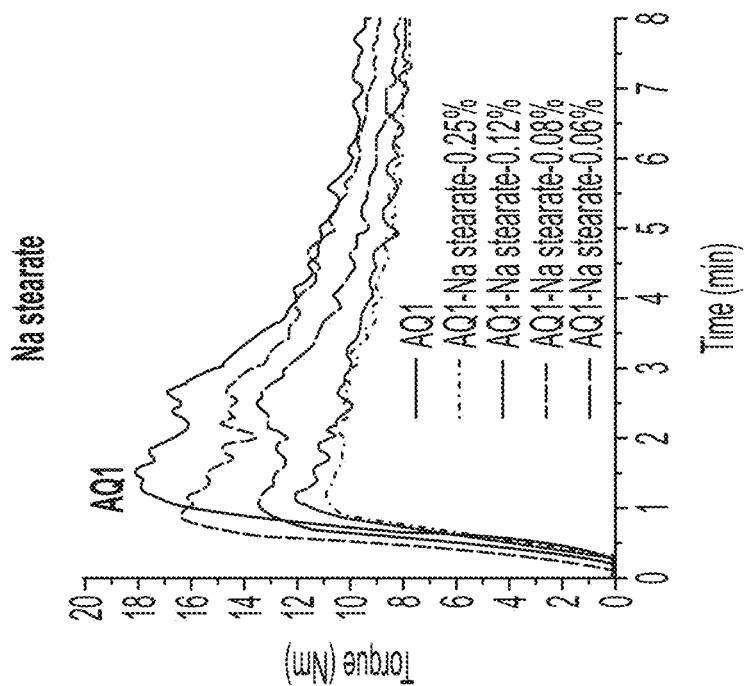
FIG. 5 illustrates torque analysis of the polyvinyl alcohol homopolymers stabilised with sodium stearate.
Figure 4:
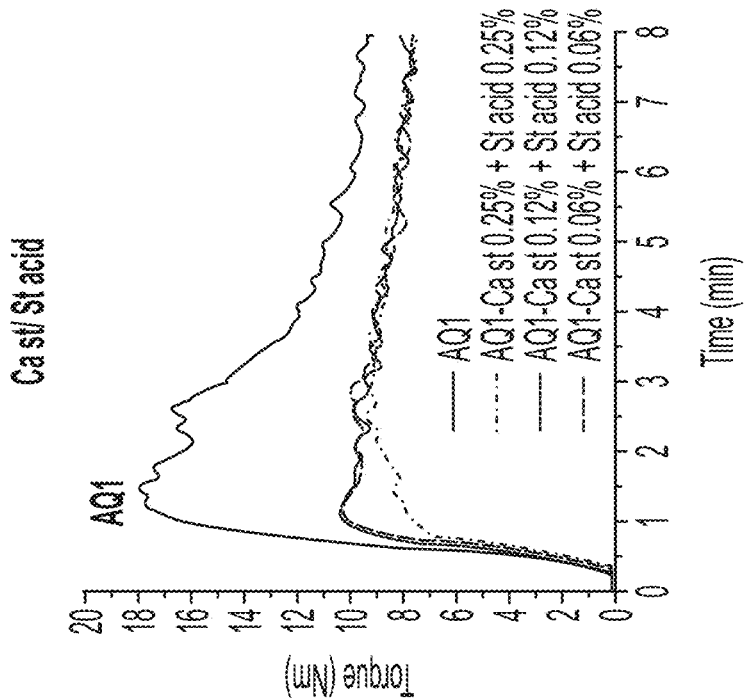
FIG. 4 illustrates torque analysis of the polyvinyl alcohol homopolymers stabilised with calcium stearate and stearic acid.
Figure 7:
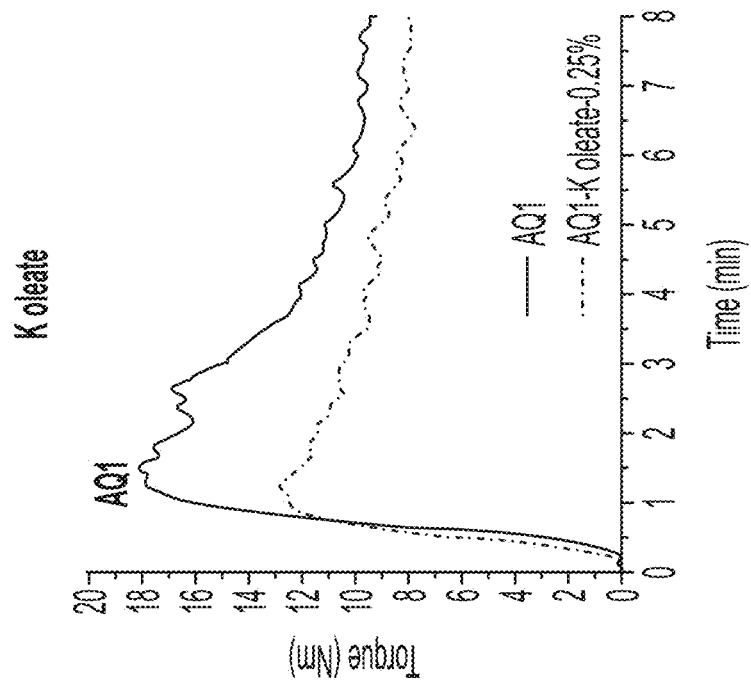
FIG. 7 illustrates torque analysis of the polyvinyl alcohol homopolymers stabilised with potassium oleate.
Figure 6:
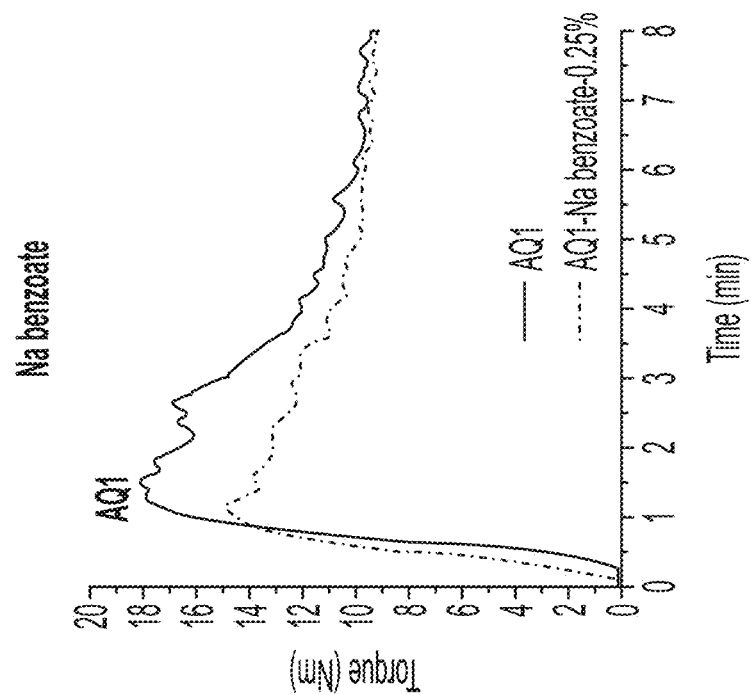
FIG. 6 illustrates torque analysis of the polyvinyl alcohol homopolymers stabilised with sodium benzoate.

According to a first aspect of the present invention, there is provided a method for the manufacture of plasticised polyvinyl alcohol polymer, the method comprising the steps of:

introducing into a mixing reactor a polyvinyl alcohol polymer comprising homopolymeric polyvinyl alcohol or a blend thereof having a degree of hydrolysis in the range of 93 wt % to 98 wt % or more;

wherein the mixing reactor comprises a blending chamber having a primary inlet, a primary outlet and at least two inter-engaging components extending between the primary inlet and primary outlet, the components being arranged to apply a shearing force to the polymer while the polymer is conveyed by the components from the inlet through a reaction zone to the outlet;

one or more secondary inlets located downstream from the primary inlet for introducing reactants comprising a processing aid, a plasticiser and a reactive stabiliser to the chamber to form a reaction mixture;

wherein the plasticiser is selected from the group consisting of: sugar alcohols, diols, triols, polyols and mixtures thereof;

wherein the reactive stabiliser is selected from the group consisting of:

sodium stearate, potassium oleate, sodium benzoate, calcium stearate, stearic acid, dimethyl propionic acid, and mixtures thereof;

wherein the blending chamber comprises a plurality of heated regions arranged so that the mixture is subjected to a temperature profile whereby the temperature increases from the inlet to the outlet;

a secondary outlet located between the reaction zone and primary outlet arranged to allow removal of processing aid from the chamber;

reacting the processing agent, plasticiser and polymer in the reaction zone to form plasticised polymer; and allowing the plasticised polymer to pass from the primary outlet.

Use of a reactive mixing apparatus, typically an extruder in accordance with this invention allows the processing aid and plasticiser to be reacted with the polyvinyl alcohol or blend thereof, without decomposition of the polymer followed by removal of all or most of the processing aid from the secondary outlet to give plasticised polyvinyl alcohol or a blend thereof.

Use of a reactive stabiliser may result in an advantageous reduction in the extent of degradation during melt processing. This allows homopolymeric polyvinyl alcohol having a high degree of hydrolysis, for example 93 wt % or higher to be processed to form pellets, films and fibres.

The reactive stabiliser may be used in an amount of about 0.2 wt % to about 5 wt %, for example about 0.5 wt % to about 3 wt %, for example 0.5 wt % to about 2 wt %, for example from about 0.5 wt % to about 1.5 wt %, for example about 1 wt %.

The reactive stabilisers of this invention may decrease the extent of degradation of the polymer during processing. Homopolymeric polyvinyl alcohol has been difficult to process due to degradation at the high temperatures required. The liability of degradation has led to use of polyvinyl alcohol co-polymers with a consequent loss of engineering properties. This can be seen by UV spectral analysis of the amount of conjugation present in the polymer. Sodium benzoate has been found to be particularly effective.

In exemplary embodiments thin films of melt processed polyvinyl alcohol formulations of this invention remain clear and do not show a whitening effect after exposure to humidity. Use of an appropriate reactive stabiliser may provide films with improved visual appearance. A preferred reactive stabiliser is sodium benzoate. In less advantageous formulations formation of an opaque, hazy or white film after a 24-hour humidity test may indicate that phase separation has occurred.

The polyvinyl alcohol polymer may comprise polyvinyl alcohol or a blend thereof wherein the polyvinyl alcohol polymer has a degree of hydrolysis of 93 wt % to less than 98 wt %, preferably 93 wt % to 97 wt %, alternatively 93 wt % to 95 wt %.

Use of homopolymeric polyvinyl alcohol is particularly advantageous. Homopolymeric polyvinyl alcohol is manufactured by hydrolysis of homopolymeric polyvinyl acetate, the degree of hydrolysis being 93 wt % or more in embodiments of this invention. Polyvinyl alcohol co-polymers made by hydrolysis of polyvinyl acetate co-polymers have inferior properties compared to homopolymeric polyvinyl alcohol. Homopolymeric polyvinyl alcohol may exhibit the following advantageous properties.

Polyvinyl alcohol polymers of this invention may have excellent film-forming, emulsifying and adhesive properties. The polymers exhibit excellent barrier properties including resistance to oil, grease and solvents. The polymers may also have high tensile strength and flexibility, as well as high oxygen and aroma barrier properties.

The polyvinyl alcohol may be manufactured by hydrolysis of homopolymeric polyvinyl acetate, wherein the extent of hydrolysis is in the range from 93 wt % up to 98 wt %, for example 93 wt % to less than 98 wt %, for example 93 wt % to 97 wt %, for example 93 wt % to 95 wt %.

A blend of two or more polyvinyl alcohol polymers may be employed, for example a blend of two polyvinyl alcohol polymers with a relatively high molecular weight and a relatively low molecular weight respectively.

A blend of polyvinyl alcohols with different hydrolysis levels can be combined. Blending different polyvinyl grades together enables the properties of the resultant polymer to be enhanced, for example, viscosity, solubility and melt strength.

A blend of two polyvinyl alcohol polymers having the same degree of hydrolysis but with different viscosities may be employed. For example, one polymer may have a viscosity of 5 cp and the other may have a viscosity of 28 cp in order to provide a polymer with a specific desired viscosity. The viscosity may be adjusted by changing the ratio of lower viscosity polymer to higher viscosity polymer.

In an embodiment, a blend where the ratio of higher viscosity to lower viscosity polyvinyl alcohols is 80:20 wt % the resultant polymer may be more viscous than a blend with a 40:60 wt % ratio. This enables properties of the polymer to be controlled for use in specific applications. Controlling combinations with different degrees of hydrolysis and ratios of relative weights of the polymers allows consequent control of the solubility of the polymer. For example, two polymers with the same plasticisers, one with a blend of polyvinyl alcohol with a degree of hydrolysis greater than 98% may have a dissolution temperature of 70° C. in water, whereas the blend of polyvinyl alcohol with a degree of hydrolysis of 87-96% may have a dissolution temperature of 40° C. in water. A blend of the same polyvinyl alcohols in a ratio of 80:20 wt % may be soluble in water at 40° C., whereas with a ratio of 60:40 wt %, the dissolution temperature may be 30° C. This is illustrated in the table below:

| Polyvinyl alcohol (PVOH) blends | | | | |
|---|---|---|---|---|
| >98% hydrolysis, high viscosity PVOH | >98% hydrolysis, low viscosity PVOH | 85-96% hydrolysis, high viscosity PVOH | 85-96% hydrolysis, high viscosity PVOH | Solubility Temperature ° C. |
| 75% | 25% | | | 70 |
| | | 60% | 40% | 30 |
| | | 80% | 20% | 40 |

Melt strength may be improved by increasing the ratio of higher molecular weight to lower molecular weight polyvinyl alcohols in a blend.

For example, a blend may comprise a low viscosity grade having a molecular weight in the range 13,000 to 27,000 and a degree of polymerisation of 300-600 and a medium-high viscosity grade having a molecular weight in the range 107,000 to 120,000 and a degree of polymerisation of 2,400 to 2,600.

In embodiments, the polyvinyl alcohol consists of a blend of two or more polyvinyl alcohol polymers each having a degree of hydrolysis of 93% to 98%, preferably one with a high molecular weight and at least one low molecular weight polyvinyl alcohol. In a preferred embodiment, the polymer comprises 80% high molecular weight polyvinyl alcohol and 20% low molecular weight polyvinyl alcohol. The ratio of high to low molecular weight molecular polyvinyl alcohol may be about 2:1 to about 10:1, alternatively about 3:1 to 7:1, alternatively about 6:1 to 4:1, alternatively about 5:1.

The high molecular weight polymer may have a molecular weight of 60,000 to 120,000.

The lower molecular weight polymer may have a molecular weight of 5,000 to 30,000.

The blends of different molecular weight polymers employed are selected in accordance with the physical properties required in the finished product. This may require different molecular weight materials being used. Use of more than two different molecular weight polymers may be advantageous. The use of a single molecular weight polymer is not precluded.

Use of a blend may allow control of the viscosity of the polymer. Selection of a stabiliser in accordance with the present invention allows use of blends of a desired viscosity without a loss of other properties. Alternatively, use of a blend may permit use of polyvinyl alcohol with one or more stabilisers while maintaining viscosity or other properties to permit manufacture of pellets or films. The processing aid is preferably water. Alternatively, the processing aid may comprise a mixture of water and one or more hydroxyl compound with a boiling point less than the boiling point or melting point of the plasticiser. Use of water is preferred for cost and environmental reasons.

When a mixture of plasticisers is employed, a binary mixture may be preferred.

The plasticiser may be selected from the group consisting of:
(a) sugar alcohols selected from the group consisting of: diglycerol, triglycerol, fructose, ribose, xylose, D-mannitol, triacetin, and mixtures thereof;
polyols selected from the group consisting of: pentaerythritol, dipentaerythritol, and mixtures thereof;
(b) diols selected from the group consisting of: methyl pentanediol, 1,2-propanediol, 1,4-butanediol, 2-hydroxy-1,3-propanediol, 3-methyl-1,3-butanediol, 3,3-dimethyl-1,2-butanediol, and mixtures thereof;
(c) glycols selected from the group consisting of: polyethylene glycol 300, polyethylene glycol 400, alkoxylated polyethylene glycol, and mixtures thereof;
(d) caprolactam, tricyclic trimethylolpropane formal, rosin esters, euricamide, and mixtures thereof.

In a first embodiment, the following plasticisers may be used in combination:
dipentaerythritol, methyl pentanediol, triacetin, 2-hydroxy-1,3-propanediol, 3,3-dimethyl-1,2-butanediol, tricyclic trimethylolpropane formal, D-mannitol, triglycerol, and xylose.

Preferably a binary composition of the plasticisers of the first embodiment is employed.

In a second embodiment, the following plasticisers are used alone or in combination with each other or in combination with one or more plasticisers of the first embodiment: caprolactam, alkoxylated polyethylene glycol.

An amount of 2-15 wt % of plasticiser may be used, wherein the total amount of plasticiser in the formulation is from about 15 wt % to about 30 wt %.

In a second embodiment, the following plasticisers are used alone or in combination with each other or with one or more plasticisers of the first embodiment: caprolactam, alkoxylated polyethylene glycol.

A suitable grade of dipentaerythritol is Di-Penta-93 (manufactured by Perstorp Corp.).

A suitable grade of caprolactam is Caprolactam 3031 (manufactured by Ingevity).

A suitable grade of alkoxylated polyethylene glycol is Alkoxylate 4528 or Alkoxylate 3380 (manufactured by Perstorp Corp.).

In exemplary embodiments thin films of melt processed polyvinyl alcohol formulations of this invention remain clear and do not show a whitening effect after exposure to humidity. Use of an appropriate lubricant may provide films with improved visual appearance. An exemplary lubricant is euricamide. In less advantageous formulations formation of an opaque, hazy or white film after a 24-hour humidity test may indicate that phase separation has occurred.

Preferred solid plasticizers or reactive stabilisers may also be volatile under processing conditions at the processing temperature. Preferred plasticizers or reactive stabilisers have a melting point in the range of about 150° C. to about 300° C., typically about 150° C. to about 275° C.

A solution of the plasticiser or stabiliser in water may be injected through a single secondary inlet.

A solid plasticiser or stabiliser may be fed independently or together with one or more of the polymeric materials of the formulation.

Polymers containing the stabilisers and/or plasticisers of this invention provide films which may exhibit complete clarity after a 24-hour humidity test.

One or more processing aids may be employed. Euricamide may be used as a slip additive. An amount of 0-5 wt % may be used.

Further additives may be used, including antioxidants, lubricants, dyes and pigments.

The water content of polymers of this invention may be in the range of about 0.1 wt % to about 5 wt %, for example, about 1 wt % to about 4 wt %.

The processing temperature may have a maximum of about 260° C., dependent on dwell time in the higher temperature zones of the extruder.

In an exemplary embodiment, the mixing reactor comprises a twin screw extruder. Alternatively, the mixing reactor may comprise a batch reactor for smaller scale processes. The mixing reactor should have a high internal surface area to allow efficient heat dissipation.

The extruder reactor chamber may be composed of 5-20 heated regions, typically 10-15, more preferably about 12 regions. The temperature profile may rise from ambient temperature at the first region to 200° C. adjacent the outlet. The reaction zone may have a temperature of up to 260° C.

The location of the reaction zone may be controlled by selection and adjustment of one or more of: the screw configuration, the formulation, the temperature profile, rotational speed of the one or more screws (depending on reactor type) and the rate of feed of the reaction mixture into the apparatus. The location of the reaction zone may be determined by the temperature as measured by one or more thermocouples or other temperature sensors located arranged along the length of the chamber. In a preferred embodiment, the reaction zone is controlled so that it is located prior to the secondary outlet, upstream of the primary outlet. The location of the reaction zone may be adjusted so that the reaction is complete prior to venting.

Energy provided by the application of shear forces and control of the temperature of the polymer mixture allows control of the chemical energetics of the exothermic reaction between the processing aid and the hydrogen bonded crystalline domains of the polymer following commencement of the exothermic reaction. Failure to affect adequate temperature control may lead to decomposition and even carbonisation of the polymer mixture.

In a preferred embodiment, the configuration of the screws, typically co-rotating closely intermeshing twin screws of a twin screw extruder, may be as follows.

A conveying section may be provided at the throat or inlet of the extruder. The feed rate should be regulated so that the throat is not overfed. The conveying section is followed by an intensive mixing zone, followed in turn by a conveying section which forms the reaction zone. In the reaction zone, the reaction goes essentially to completion. This is followed by an intensive mixing section in which the reaction is driven fully to completion. Following the intensive mixing section, there is a low pressure zone where venting is allowed. A compression zone then feeds the mixture to a dye, pump or simple screw extruder.

The temperatures which may be used for a blown film formulation are as follows:

| Zone | 0 | 1 | 2 | 3 | 4 | 5 | 6 | 7 | 8 | 9 | 10 | 11 | 12 |
|---|---|---|---|---|---|---|---|---|---|---|---|---|---|
| Temp. (° C.) | x | 20 | 22 | 75 | 155 | 195 | 200 | 200 | 200 | 200 | 200 | 200 | 200 |

The temperatures which may be used for an extrusion coating formulation are as follows:

| Zone | 0 | 1 | 2 | 3 | 4 | 5 | 6 | 7 | 8 | 9 | 10 | 11 | Die |
|---|---|---|---|---|---|---|---|---|---|---|---|---|---|
| Temp. (° C.) | x | 10 | 10 | 75 | 200 | 235 | 250 | 250 | 250 | 230 | 230 | 225 | 225 |

The temperature of the reaction mixture may not be the same as the set point values because of mechanical heating stemming from the mixing process, shear heating effects and the reaction exotherm and the poor heat transfer to coolant in a steel reaction vessel. Those skilled in the art are capable of judging the appropriate processing conditions.

An intensive mixing region may be provided downstream of the reaction zone to ensure completion of the reaction of the processing aid and polymer. In a preferred embodiment, the intensive mixing region may comprise a paddle mixer located between the reaction zone and the secondary outlet. The mixing region may be a kneading region comprising pairs of inter-engaging rotor blades or paddles.

Preferred mixing reactors are self-cleaning in use. Co-rotating intermeshing screws as used in twin screw extruders may be employed. The stated operating conditions may be employed using appropriate start-up and shut-down procedures.

For start-up, a completely empty and clean extruder barrel may be used. The water or processing aid feed is started, followed by the polymer powder and plasticiser either simultaneously or successively. The initial feed rate and screw rotation are lower than the steady state speeds. In the case where the die is connected directly to the twin screw extruder, once a coherent strand is produced the feed rate and screw speeds are raised to the steady state conditions. The fitting of a dry face cutter or strand pelletiser is carried out in the usual way known to those skilled in the art. When a single screw is employed, this must be empty and connected to the twin screw extruder prior to start-up.

Pre-flushing with standard flushing agents such as low-density polyethylene, high density polyethylene or polypropylene, whether filled or unfilled, is neither necessary nor desirable when using the process of the present invention. When the die is attached to the single screw extruder pelletiser filling is as described above.

In order to provide a clean extruder for a subsequent start-up, the shut-down procedure may involve stripping all feeds and reducing all screw speeds and continued running until as much material as possible has been delivered. Where the twin screw extruder is coupled to a single screw extruder or other form of melt pump, the twin screw may be decoupled from the single screw and the die may also be uncoupled. The die is placed in a heated oven at 300-450° C. to burn off any remaining polymer or soaked in hot water until the polymer dissolves or becomes swollen so that it can be readily removed mechanically. The temperature of the decoupled twin screw extruder may be then lowered to a uniform 100-110° C. with rotation of the screws so that the residual polymer is ejected as crumb-like material until the barrels are empty. The barrel may be then polished by feeding some of the dried powdered polymer. After the polishing stage, the final residual material is ejected.

In the case of a single screw extruder, the optimal processing temperature of about 200° C. is maintained. If a closed barrel extruder is used, the screws may be decoupled and removed slowly without cooling. The polymer is pulled from the screws as it is withdrawn from the barrel. This affords a clean screw. If a clam-shell single screw extruder is used, the casing may be opened and the polymer removed quickly while hot before removing the heated screws. The barrel may be cleaned with a wire brush during cooling. Flushing the extruder barrels with a purged material is neither necessary nor effective.

The secondary outlet may be a vent permitting volatile processing aids, for example steam, to be completely or partially removed from the polymer mixture.

When water is the processing aid, the water content of the plasticised polymer may be less than 5 wt %, preferably less than 2 wt %, more preferably not more than 0.5 wt %.

In an alternative embodiment, an inlet for the processing aid is located upstream of the inlet for the plasticiser. This allows the polymer to mix with the processing aid before the plasticiser is introduced. Without wishing to be bound by theory it is believed that the molecules of a plasticiser such as neopentyl glycol may be slow to break into the crystalline domains of the polyvinyl alcohol. Energy provided by the application of shear forces to and control of the temperature of the polymer mixture allows control of the chemical energetics of the exothermic reaction between the processing aid and the hydrogen bonded crystalline domains of the polymer following commencement of the exothermic reaction. Failure to effect adequate control may lead to degradation and even carbonisation of the polymer.

The rate of rotation of the twin screws may be regulated to control the specific energy per unit length of the reactive mixing chamber so that the screws serve as energy input devices.

In a typical embodiment, the chamber of the mixing reactor may be 30%-70% filled with the polymer mixture with the remaining volume being empty or serving as a lower pressure zone to facilitate devolatilisation. Consequently, the rate of output of polymer from the primary outlet may not be consistent and may be pulsed. A compaction zone may be employed to provide a continuous output.

In a preferred embodiment, the mixing reactor is a twin screw extruder having a preferred length to diameter ratio in the range 25:1 to 50:1, preferably about 25:1 to 45:1, more preferably about 40:1. For example a typical mixer reactor may have two 95 mm diameter screws with a length of 4.8 metres.

The primary outlet may comprise a die, for example a multistrand die.

Alternatively, in an advantageous embodiment of the invention, a pump may be provided downstream of the primary outlet. The pump may comprise a single screw extruder unit. The configuration and speed of rotation of the single screw may be selected so that the pump is full of plasticised polymer during use. In this way the screw serves as a variable pump which is controllable to provide a constant flow of polymer to a die located downstream of the reactive mixer.

Application of shear by mixing a temperature-controlled mixture of polyvinyl alcohol and water, or other processing aid, gives rise to an exothermic reaction which when properly controlled serves to reduce or destroy crystallinity of the high degree of hydrolysis polyvinyl alcohol. Without wishing to be bound by theory, it is believed that lattice energy of the crystalline polyvinyl alcohol is released by the introduction of hydrogen bonding due to incorporation of water, or other processing aid, into the polymer mixture.

The onset of the exothermic reaction may be controlled by selection of the temperature profile and shear rate applied in the twin screws. The extent of the exothermic reaction may be controlled by the rate of heat removal from the mixer, by the composition and feed rate of the reaction mixture, and by regulation of the shear energy input and location of the reaction zone. The location of the reaction zone at which the exothermic reaction occurs may be controlled by appropriate control of the temperature profile and rate of rotation.

The boiling point of the processing aid is preferably selected so that it is less than the temperature of the reaction and mixing zones, permitting venting of excess processing aid from the polymer mixture.

The mean residence time in the mixer may be about 2-10 minutes, preferably about 5 minutes. The residence time in the reactor is preferably sufficient to allow completion of the reaction so that a viscoelastic melt is obtained with a minimum amount of unreacted polyvinyl alcohol.

A cooling chamber may be located downstream of the die. This may comprise a system of moving rollers located in a controlled atmosphere arranged so that the polymer strands emerging from the die are maintained under appropriate tension as they cool and solidify prior to pelletization.

The percentages referred to in this specification may be selected from any of the ranges quoted to total 100%. Percentages or other quantities used in the specification are by weight unless indicated otherwise.

According to a second aspect of the present invention a homopolymeric polyvinyl alcohol polymer composition comprises: homopolymeric polyvinyl alcohol having a degree of hydrolysis of 93% or higher,
a plasticiser and a reactive stabiliser;
wherein the plasticiser is selected from the group consisting of: sugar alcohols, diols, triols, polyols and mixtures thereof;
wherein the reactive stabiliser is selected from the group consisting of:
sodium stearate, potassium oleate, sodium benzoate, calcium stearate, stearic acid, dimethyl propionic acid, and mixtures thereof;
wherein the polymer is a viscoelastic thermoplastic material.

According to a third aspect of the present invention a method of reducing degradation of homopolymeric polyvinyl alcohol during processing includes the steps of the method of the first aspect of this invention.

The polyvinyl alcohol composition of this invention provides many advantages in relation to previously used compositions. Exemplary compositions are extrudable and can be used for making pellets, films and fibres.

The invention is further described by means of example but not in any limitative sense.

EXAMPLE

Example 1: Use of Sodium Benzoate

Sodium benzoate was used as a reactive stabiliser with various plasticisers and combinations of plasticisers as listed below:
trimethylolethane (TME) and trimethylolpropane (TMP) 1:2 ratio
trimethylolethane (TME) and trimethylolpropane (TMP) 1:1 ratio
trimethylolethane (TME) and trimethylolpropane (TMP) 2:1 ratio
neopentyl glycol (NPG) and trimethylolpropane (TMP) 1:1 ratio
neopentyl glycol (NPG) and trimethylolpropane (TMP) 2:1 ratio
neopentyl glycol (NPG) and trimethylolpropane (TMP) 3:1 ratio
tripentaerytheritol (TPE) and trimethylolpropane (TMP) 1:4 ratio
diethylpentanediol dineopentanoate (DEPD) and trimethylolpropane (TMP) 1:3 ratio
diethylpentanediol dineopentanoate (DEPD) and trimethylolpropane (TMP) 1:2 ratio
diethylpentanediol dineopentanoate (DEPD) and trimethylolpropane (TMP) 1:1 ratio Sodium benzoate was used as the reactive stabiliser and the plasticiser combinations and ratios were changed.

The results show that when using sodium benzoate as a reactive stabiliser and changing the plasticiser combinations and plasticiser ratios the degradation of the polymer can be controlled. For example, with the NPG:TMP plasticiser combination increasing the ratio of NPG to the TMP results in a larger increase in the degradation of the polymer. When using the same plasticiser ratio of 3:1 but with different plasticisers specifically, pentaerythritol, TME and NPG, it was found that the TME:TMP combination was superior and had the least degradation. From the degradation data the preferred plasticiser combinations are TME:TMP and DEPD:TMP.

Crystallinity of the polymer is important as it can affect the secondary and tertiary processes needed to create a final product. For example, if the film is too crystalline then the ability to process the film into product is hindered as it is too brittle. Crystallinity of the polymer in the form of a pellet, film or conditioned film (that is film that has been exposed to humidity) has been compared. The results are shown in FIG. 1.

The addition of a reactive stabiliser in accordance with this invention may reduce the crystallinity of the film. In general, the crystallinity values of the pellets were slightly higher or similar to that of the films. However, there was no significant change in the crystallinity before and after humidity treatment.

When an alternative plasticiser was used in the formulation, the Tg value could be observed by DSC analysis. The Tg values obtained were in the region of 44-65° C. The melting peak (Tm) for all of the reactive stabiliser and plasticiser combinations were within the region of 200-215° C. Therefore, from a thermal perspective the combinations of plasticisers and reactive stabilisers are shown to be suitable for processing. However, a preferred combination is sodium stearate with the plasticiser combination TMP and pentaerythritol.

The results are shown in the following Table:

| Plasticiser | Reactive Stabiliser | Tg ° C. | Tm ° C. (peak) |
| --- | --- | --- | --- |
| Polyol 3990/Penta | bis-MPA | 57 | 208 |
| TMP/Penta | sodium benzoate | 47 | 211 |
| TMP/Penta | potassium oleate | 47 | 210 |
| TMP/Penta | sodium stearate | 44 | 209 |
| D-Mannitol | sodium stearate | 49 | 211 |
| MPD/Di penta | sodium benzoate | 59 | 213 |

The phase separation of a film which does not contain a reactive stabiliser was observed after 24 hours. The film became milky. Using sodium benzoate as the stabiliser in combination with various plasticisers and combinations of plasticisers resulted in a clear film after conditioning.

Torque analysis of the polyvinyl alcohol homopolymers stabilised with various reactive stabilisers was carried out in a batch mixer. Processing was performed with total batches of 40 g at 190° C. and 60 rpm for 8 min. All stabilisers reduced the torque. A combination of calcium stearate with stearic acid gave the biggest reduction. The results are shown in FIGS. 2-7.

| Reactive stabiliser | Temp | Max Torque (Nm) | Torque Levelled Value (Nm) |
|---|---|---|---|
| No stabiliser | 190° C. | 17.7 | 9.6 |
| calcium stearate | 190° C. | 13.7 | 8.2 |
| stearic acid | 190° C. | 11.4 | 8.2 |
| calcium stearate and stearic acid | 190° C. | 9.3 | 7.7 |
| Sodium stearate | 190° C. | 10.7 | 7.7 |
| Sodium benzoate | 190° C. | 14.9 | 9.2 |
| potassium oleate | 190° C. | 12.7 | 8.0 |

DSC Data

| Reactive stabiliser | Tm ° C. | Crystallization % |
|---|---|---|
| No stabiliser | 206 | 45 |
| calcium stearate | 202 | 59 |
| stearic acid | 205 | 58 |
| calcium stearate and stearic acid | 203 | 59 |
| sodium stearate | 206 | 52 |
| sodium benzoate | 206 | 49 |
| potassium oleate | 204 | 51 |

What is claimed is:

1. A method for manufacture of plasticized homopolymeric polyvinyl alcohol, the method comprising the steps of:
   introducing into a mixing reactor a polyvinyl alcohol polymer consisting of polyvinyl alcohol or a blend thereof having a degree of hydrolysis greater than 93 wt %;
   wherein the mixing reactor comprises a blending chamber having a primary inlet, a primary outlet and at least two inter-engaging components extending between the primary inlet and primary outlet, the components being arranged to apply a shearing force to the polymer while the polymer is conveyed by the components from the inlet through a reaction zone to the outlet;
   one or more secondary inlets located downstream from the primary inlet for introducing ingredients consisting of water, a plasticizer and a reactive stabilizer to the chamber;
   wherein the plasticizer is selected from the group consisting of: diglycerol, triglycerol, fructose, ribose, xylose, D-mannitol, triacetin, pentaerythritol, dipentaerythritol, methyl pentanediol, 1,2-propanediol, 1,4-butanediol, 2-hydroxy-1,3-propanediol, 3-methyl-1,3-butanediol, 3,3-dimethyl-1,2-butanediol, caprolactam, tricyclic trimethylolpropane formal, erucamide and mixtures thereof;
   wherein the reactive stabilizer is selected from the group consisting of: sodium stearate, potassium oleate, sodium benzoate, calcium stearate, dimethyl propionic acid, and mixtures thereof;
   wherein the blending chamber comprises a plurality of heated regions arranged so that the ingredients are subjected to a temperature profile whereby the temperature increases from the inlet to the outlet;
   a secondary outlet located between the reaction zone and primary outlet arranged to allow removal of water from the chamber;
   reacting water, plasticizer, reactive stabilizer and the polyvinyl alcohol polymer in the reaction zone to form the plasticized polymer; and
   allowing the plasticized polymer to pass from the primary outlet.

2. A method as claimed in claim 1, wherein the reactive stabilizer is sodium benzoate.

3. A method as claimed in claim 1, wherein the amount of the reactive stabilizer relative to the amount of the composition is from 0.2 wt % to 5 wt %.

4. A method as claimed in claim 3, wherein the amount of the reactive stabilizer relative to the amount of the composition is from 0.5 wt % to 3 wt %.

5. A method as claimed in claim 4, wherein the amount of the reactive stabilizer relative to the amount of the composition is from 0.5 wt % to 2 wt %.

6. A method as claimed in claim 5, wherein the amount of reactive stabilizer relative to the amount of the composition is from 0.5 wt % to 1.5 wt %.

7. A method as claimed in claim 1, wherein the polyvinyl alcohol polymer comprises polyvinyl alcohol or a blend thereof wherein the polyvinyl alcohol has a degree of hydrolysis of 93 wt % to 98 wt %.

8. A method as claimed in claim 7, wherein the degree of hydrolysis is 93 wt % to 97 wt %.

9. A method as claimed in claim 8, wherein the degree of hydrolysis is 93 wt % to 95 wt %.

10. A method as claimed in claim 1, wherein the polyvinyl alcohol polymer is a blend of two or more polyvinyl alcohol polymers.

11. A method as claimed in claim 10, wherein the blend comprises a polymer having a molecular weight in the range 13,000 to 27,000 and a degree of polymerization of 300-600 and a medium/high viscosity grade having a molecular weight in the range 107,000 to 120,000 and a degree of polymerization of 2,400 to 2,600.

12. A method as claimed in claim 1, wherein at least two or more plasticizers are selected from the group consisting of dipentaerythritol, methyl pentanediol, triacetin, 2-hydroxy-1,3-propanediol, 3,3-dimethyl-1,2-butanediol, tricyclic trimethylolpropane formal, D-mannitol, triglycerol, and xylose.

13. A method as claimed in claim 1, wherein the amount of reactive stabilizer relative to the amount of the composition is 1 wt %.

* * * * *